(12) United States Patent
Kawazura

(10) Patent No.: US 6,652,641 B2
(45) Date of Patent: Nov. 25, 2003

(54) PROCESS FOR PRODUCTION OF MODIFIED CARBON BLACK FOR RUBBER REINFORCEMENT AND RUBBER COMPOSITION CONTAINING MODIFIED CARBON BLACK

(75) Inventor: Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 09/448,177

(22) Filed: Nov. 24, 1999

(65) Prior Publication Data

US 2002/0169242 A1 Nov. 14, 2002

(30) Foreign Application Priority Data

Nov. 30, 1998 (JP) .......................................... 10-339043

(51) Int. Cl.$^7$ ................................................. C09C 1/44
(52) U.S. Cl. ..................... 106/475; 423/449.2; 524/261
(58) Field of Search ........................ 524/261; 106/475; 423/449.2

(56) References Cited

U.S. PATENT DOCUMENTS 5,679,728 A * 10/1997 Kawazura et al. .......... 523/215
5,763,388 A * 6/1998 Lightsey et al. ............ 523/212
6,248,808 B1 * 6/2001 Sone et al. .................. 523/215

FOREIGN PATENT DOCUMENTS

| JP | 50-12454 | 5/1975 |
| JP | 7-30269 | 4/1995 |
| JP | 08277347 A | 10/1996 |
| JP | 10046047 A | 2/1998 |

* cited by examiner

Primary Examiner—Peter D. Mulcahy
(74) Attorney, Agent, or Firm—Arent Fox Kintner Plotkin & Kahn PLLC

(57) ABSTRACT

A process for producing a modified carbon black for rubber reinforcement comprising:

adding, to carbon black, water-dispersed silica and an organosilane compound having the formula (I):

$$R^1{}_n\!-\!Si\!-\!(OR^2)_{4-n} \qquad (I)$$

wherein $R^1$ represents a hydrocarbon group having 1 to 10 carbon atoms, $R^2$ represents a hydrogen atom or a hydrocarbon group having 1 to 10 carbon atoms, n is 1 or 2, and $R^1$ and $R^2$ may be the same or different, and mixing and dispersing the mixture.

7 Claims, No Drawings

PROCESS FOR PRODUCTION OF MODIFIED CARBON BLACK FOR RUBBER REINFORCEMENT AND RUBBER COMPOSITION CONTAINING MODIFIED CARBON BLACK

BACKGROUND OF THE INVENTION

1. Field of the Invention

The present invention relates to a process for producing a modified carbon black for rubber reinforcement (hereinafter sometimes simply referred to as "modified carbon black"). More specifically, the present invention relates to a process for producing a composite of carbon black and silica by using an organoalkoxysilane compound to produce a modified carbon black. The modified carbon black for rubber reinforcement thus obtained can be used in rubber compositions for tires and also for various types of rubber products such as rubber compositions for belt conveyors and industrial rolls, to provide rubber physical properties such as the decrease in tan δ at a high temperature atmosphere (60° C.–100° C.), low heat generation due to the deformation and low loss of the driving energy. Especially, when the rubber composition containing the modified carbon black is used as a rubber composition for a tire tread, etc., tan δ at around 60° C. corresponding to the rolling resistance of the tire can be decreased, without decreasing tan δ at around 0° C. corresponding to braking performance of the tire, and therefore, tires having superior braking performance and low combustion cost can be produced. In addition, the modified carbon black of the present invention can be produced, without any major changes in the conventional carbon black production facilities, and therefore, can be produced at a low cost.

2. Description of the Related Art

Reinforcing fillers such as carbon black and silica have long been used for reinforcing rubber as is well known in the art. Since, among these fillers, silica, as compared with carbon black, has properties of providing a low tan δ at high temperatures (i.e., around 60° C.) and a high tan δ at low temperatures (i.e., around 0° C.), when used for rubber compositions for tire treads for example, a tire having a low rolling resistance and a high gripping power can be advantageously produced. However, silica is inferior to carbon black in the poor abrasion resistance and the low electrical conductivity, and therefore, if used for tires, there is the problem that the tire will pick up a charge when driven on and will cause various problems such as noise and, in some cases, even misoperation in electronic equipments such as radios.

Covering the surface of a pigment, etc. with silica etc. to improve the dispersion and to increase weather resistance has been proposed in, for example, Japanese Examined Patent Publication (Kokoku) No. 50-14254, Japanese Examined Patent Publication (Kokoku) No. 7-30269 and Japanese Unexamined Patent Publication (Kokai) No. 8-277347. For example, Japanese Examined Patent Publication (Kokoku) NO. 7-30269 discloses a method of treating the surface of carbon black used for a powder paint comprising the steps of dispersing carbon black in water, adjusting the pH to 6 or more, and, while maintaining the temperature of 70° C. or more, precipitating amorphous silica on the surface of the particles of carbon black using sodium silicate. Further, Japanese Unexamined Patent Publication (Kokai) No. 8-277347 discloses the adhesion of silica to the surface of carbon black used for rubber reinforcement. However, there are still needs for modified carbon black for rubber reinforcement capable of improving the balance of tan δ (0° C.) and tan δ (60° C.) when compounded into rubber.

SUMMARY OF THE INVENTION

Accordingly, an object of the present invention is to provide a process for simply and cheaply producing a modified carbon black for reinforcement of rubber having a superior balance of tan δ (0° C.) and tan δ (60° C.), without losing the other characteristics.

In accordance with the present invention, there is provided a process for producing a modified carbon black for rubber reinforcement comprising:

adding, to carbon black, water-dispersed silica and an organosilane compound having the formula (I):

$$R^1{}_n\text{—Si—}(OR^2)_{4-n} \quad (I)$$

wherein $R^1$ represents a hydrocarbon group having 1 to 10 carbon atoms, $R^2$ represents a hydrogen atom or a hydrocarbon group having 1 to 10 carbon atoms, n is 1 or 2, and $R^1$ and $R^2$ may be the same or different, and mixing and dispersing the mixture.

In accordance with the present invention, there is also provided a rubber composition comprising a crosslinkable rubber and the modified carbon black, compounded therein, produced by the above-mentioned process.

BEST MODE FOR CARRYING OUT THE INVENTION

As the carbon black for rubber reinforcement used as the starting material for production of a modified carbon black for rubber reinforcement in the present invention, it is possible to use any carbon black which is generally used in the past for tires and other rubber compositions. Preferable carbon blacks are the SRF to SAF grades. It is possible to use the same differently or blend two or more types depending on the application of the rubber composition.

A general method for producing a modified carbon black for rubber reinforcement according to the present invention will be explained below. First, as the water-dispersed silica, it is possible to use those produced by mixing and reacting a metal silicate salt and an acid. The form of the water-dispersed silica (e.g., it may be either a sol or a gel) and the concentration of the silica in the water-dispersed silica are not particularly limited, but a sol type silica in which the silica particles exist independently is preferred. A silica concentration of 50,000 ppm or less, which is stable for a sol, is suitable. Further, as the water-dispersed silica, it is also possible to use a commercially available water-dispersed silica. As a commercially available water-dispersed slurry, those having a diameter of the silica particles contained of from 1 to 100 nm are preferred, more preferably those having a diameter of 5 to 80 nm, and having a sodium ion of 1.0% by weight or less, in terms of $Na_2O$ are preferred. This type water-dispersed silica is composed of primary particles or aggregates containing plural primary particles dispersed in water. Usually, the electrolyte content is extremely small, and therefore, it is stabilized in a basic state containing a high concentration of silica. Thus, the water-dispersed silica may be particularly suitably used when the silica content is intended to be increased in modified carbon. In the present invention, when producing a modified carbon black, the water-dispersed silica can be added, without particularly adjusting the pH thereof, but it is also possible, for example to add an acid to adjust the neutral conditions to prevent the gelation of the silica or to prevent the corrosion of the granulator. Thereafter, the silica is mixed with the carbon black, whereby the composite of the carbon black is formed.

According to the present invention, in the production of the carbon black for rubber reinforcement, the organosilane compound having the formula (I), in addition to the water-dispersed silica, is added. In the formula (I), the group $R^1$ represents a hydrocarbon group having 1 to 10 carbon atoms, that is, a saturated or unsaturated aliphatic hydrocarbon group (i.e., typically alkane, alkene or alkyne group) having 1 to 10, preferably 1 to 6, carbon atoms, a alicyclic hydrocarbon group (i.e., typically cycloalkyl group) having 3 to 10, preferably 3 to 8, carbon atoms, or an aromatic hydrocarbon group (i.e., typically phenyl group) having 6 to 10, preferably 6 to 8, carbon atoms, and $R^2$ represents a hydrogen atom or a hydrocarbon group similar to $R^1$.

In the production of the modified carbon black for the rubber reinforcement according to the present invention, the total amount of the water-dispersed silica and the organosilane compound is preferably 0.1% to 50% by weight, more preferably 0.5% to 25% by weight, in terms of $SiO_2$, based upon the total weight of the modified carbon black. Further, the amount of the organosilane compound is preferably 80% by weight or less, more preferably 1% to 50% by weight, in terms of $SiO_2$, based upon the total amount of the water-dispersed silica and the organosilane compound. If the addition amount of the water-dispersed silica and the organosilane compound is too small, the reactivity with a silane coupling agent tends to decrease. Contrary to this, if the amount is too large, the electrical conductivity of the compounded rubber tends to increase. In addition, if the addition amount of the organosilane compound is too small, the adhesion power between the surface of the carbon black and the particles of colloidal silica tends to decrease. Contrary to this, if the amount is too large, the amount of the alcohol generated during the production is increased so that the treatment thereof becomes troublesome.

Note that the organosilane compounds having the formula (I) are known in the art and the commercially available products can be used directly. Examples thereof are 3-acetoxypropyltrimethoxysilane, 3-acryloxypropylmethyldimethoxysilane, 3-acryloxypropyltrimethoxysilane, allyltriethoxysilane, allyltrimethoxysilane, amyltriethoxysilane, benzyltriethoxysilane, 5-(bicycloheptenyl)triethoxysilane, t-butoxytrimethylsilane, n-butyltrimethoxysilane, [2-(3-cyclohexenyl)ethyl]trimethoxysilane, (3-cyclopentadienylpropyl)triethoxysilane, dicyclohexyldimethoxysilane, diethyldiethoxysilane, diethyl(triethoxysilylpropyl)malonate, (3,3-dimethoxypropyl)trimethoxysilane, dimethyldiacetoxysilane, dimethyldiethoxysilane, dimethyldimethoxysilane, diphenyldiethoxysilane, diphenyldimethoxysilane, ethyltriethoxysilane, ethyltrimethoxysilane, n-hexyltrimethoxysilane, isobutyltrimethoxysilane, 3-methoxypropyltrimethoxysilane, methyldiethoxysilane, methyldimethoxysilane, methylphenyldiethoxysilane, methylphenyldimethoxysilane, methyltriethoxysilane, methyltrimethoxysilane, methyltri-n-isopropoxysilane, octa-7-enyltrimethoxysilane, n-octylmethyldimethoxysilane, n-octyltriethoxysilane, phenetyltrimethoxysilane, phenyltriethoxysilane, phenyltrimethoxysilane, phenylvinyldiethoxysilane, n-propyltrimethoxysilane, styrylethyltrimethoxysilane, vinylmethyldiethoxysilane, vinyltriacetoxysilane, vinyltriethoxysilane, vinyltriisopropoxysilane, vinyltrimethoxysilane, vinyltriphenoxysilane, and vinyltriisopropenoxysilane.

The characteristic feature of the present invention resides in the fact that the water-dispersed silica and the organosilane compound are dispersed in carbon black using an internal type mixing device or a continuous type mixing device, followed by drying to produce the modified carbon black comprising carbon black having silica adhered to the surface thereof. Accordingly, the desired modified carbon black having silica adhered to the surface thereof can be produced by adding the water-dispersed silica and the organosilane compound at the previous step of, or before or during the granulating step (either continuous type or batch type) used for producing a normal or ordinary carbon black to produce a modified carbon black composed of carbon black having silica adhered to the surface thereof. Normally, water-dispersed silica is diluted with water, or an acid (e.g., sulfuric acid, hydrochloric acid) is added thereto to bring it to the neutral region, and then this is added to the carbon black. The carbon black added with the water-dispersed silica and the organosilane compound in the above way may be stirred, granulated, and modified at a suitable temperature (e.g., 60° C. to 200° C.) using, for example, a pin type screw granulator etc.

According to the present invention, the modified carbon black for rubber reinforcement can be compounded into any cross-linkable rubber to improve the tan 6 balance. Examples of such a cross-linkable rubber are natural rubber (NR), various butadiene rubbers (BR), various styrene-butadiene copolymers (SBR), polyisoprene rubber (IR), butyl rubber (IIR), halogenated butyl rubber, acrylonitryl-butadiene rubber, chloroprene rubber, ethylene-propylene copolymer rubber, ethylene-propylene-diene copolymer rubber, styrene-isoprene copolymer rubber, styrene-isoprene-butadiene copolymer rubber, isoprene-butadiene copolymer rubber, chlorosulfonated polyethylene, acryl rubber, epichlorohydrin rubber, polysulfide rubber, silicone rubber, fluororubber, urethane rubber. These may be used alone or in any blend thereof. When a blend is used, the ratio of the blend is not particularly limited.

The modified carbon black for rubber reinforcement according to the present invention is compounded into the above rubber component in an amount of, as a solid content, 10 to 200 parts by weight of the modified carbon black for rubber reinforcement, more preferably 15 to 150 parts by weight, based upon 100 parts by weight of the rubber component. If this amount is too small, sufficient reinforcement for the rubber is not possible and, for example, the abrasion resistance etc. deteriorate. Conversely, if the amount is too large, there is the danger of the hardness becoming too high, the processability falling, or the usefulness as a rubber material otherwise becoming poorer. It is also possible to use in the rubber composition any carbon black and/or silica normally formulated into rubber compositions, in addition to the above water-dispersed silica-modified carbon black.

The rubber composition may also have suitably formulated into it, in addition to the above rubber, modified carbon black having the silica adhered to or deposited on its surface, etc., any additives normally used in the rubber industry such as sulfur, organic peroxides, softening agents, antioxidants, vulcanization accelerators, fillers, plasticizers, silane coupling agents, etc., if necessary, in an ordinary used amount.

EXAMPLES

The present invention will now be explained in further detail with reference to, but is by no means limited to the following Examples.

Reference Example 1, Examples 1 to 4 and
Comparative Examples 1 to 2

The modified carbon black 1 to 5 were prepared as follows.

1) Modified Carbon Black 1

1000 g of carbon black (i.e., Diablack N339, non-granulated) available from Mitsubishi Chemical) was charged to a kneader and, 176 g of water-dispersed silica (i.e., ST-30 manufactured by Nissan Chemical Co.: Silica content of 30% by weight) diluted to 1000 g with tap water was added thereto. The resultant mixture was mixed in the kneader under the conditions (temperature=90° C., revolution rate=45 rpm and time=15 minutes), followed by drying on a hot plate for 12 hours or more.

2) Modified Carbon Black 2

1000 g of carbon black (N339, non-granulated) was charged to a kneader, followed by adding thereto (a) a solution of 31.26 g of methyltriethoxysilane in a mixture of distilled water and ethanol, which was previously prepared by adding 30 g of ethanol to 270 g of distilled water with stirring and then by adding 31.26 g of methyltriethoxysilane thereto with stirring to be dissolved, and (b) 700 g of water-dispersed silica liquid containing 140 g of water-dispersed silica diluted with tap water. The mixture was mixed in the kneader under the same conditions as in the case of the modified carbon black 1, followed by drying on a hot plate to prepare the desired modified carbon black.

3) Modified Carbon Black 3

1000 g of carbon black (N339, non-granulated) was charged to a kneader, followed by adding thereto (a) a solution of 78.11 g of methyltriethoxysilane in a mixture of distilled water and ethanol, which was previously prepared by adding 30 g of ethanol to 270 g of distilled water with stirring and then by adding 78.11 g of methyltriethoxysilane thereto with stirring to be dissolved, and (b) 700 g of water-dispersed silica liquid containing 87.7 g of water-dispersed silica diluted with tap water. The mixture was mixed in the kneader under the same conditions as in the case of the modified carbon black 1, followed by drying on a hot plate to prepare the desired modified carbon black.

4) Modified Carbon Black 4

1000 g of carbon black (N339, non-granulated) was charged to a kneader, followed by adding thereto (a) a solution of 26.0 g of dimethyldiethoxysilane in a mixture of distilled water and ethanol, which was previously prepared by adding 30 g of ethanol to 270 g of distilled water with stirring and then by adding 26.0 g of dimethyldiethoxysilane thereto with stirring to be dissolved, and (b) 700 g of water-dispersed silica liquid containing 140 g of water-dispersed silica diluted with tap water. The mixture was mixed in the kneader under the same conditions as in the case of the modified carbon black 1, followed by drying on a hot plate to prepare the desired modified carbon black.

5) Modified Carbon Black 5

1000 g of carbon black (N339, non-granulated) was charged to a kneader, followed by adding thereto (a) a solution of 34.74 g of phenyltrimethoxysilane in a mixture of distilled water and ethanol, which was previously prepared by adding 30 g of ethanol to 270 g of distilled water with stirring and then by adding 34.74 g of phenyltrimethoxysilane thereto with stirring to be dissolved, and (b) 700 g of water-dispersed silica liquid containing 140 g of water-dispersed silica diluted with tap water. The mixture was mixed in the kneader under the same conditions as in the case of the modified carbon black 1, followed by drying on a hot plate to prepare the desired modified carbon black.

Methods for Measurement of Silica Contents of Modified Carbon Black

A sample of the modified carbon black was calcified at 600° C. in an electric furnace, the resultant ash was filtered and washed with distilled water to remove the salt, then was treated with hydrogen fluoride. The decrease in the weight was shown as the silica content in a percentage by weight against the weight of the original modified carbon. The results are as follows.

Modified Carbon 1:4.7 wt %

Modified Carbon 2:4.6 wt %

Modified Carbon 3:4.9 wt %

Modified Carbon 4:4.9 wt %

Modified Carbon 5:5.0 wt %

Various rubber compositions were prepared by an ordinary method by mixing in a Banbury mixer and rolls according to the following Table I (Note vulcanization conditions: 160° C.×30 minutes).

TABLE I

|  | Comp. Ex. 1 | Comp. Ex. 2 | Ref. Ex. 1 | Ex. 1 | Ex. 2 | Ex. 3 | Ex.4 |
| --- | --- | --- | --- | --- | --- | --- | --- |
| Composition (wt. part) |  |  |  |  |  |  |  |
| SBR-1[*1] | 97.50 | 97.50 | 97.50 | 97.50 | 97.50 | 97.50 | 97.50 |
| SBR-2[*2] | 35.00 | 35.00 | 35.00 | 35.00 | 35.00 | 35.00 | 35.00 |
| N339 Carbon Black | 80.00 | 80.00 | — | — | — | — | — |
| Modified Carbon 1 | — | — | 80.00 | — | — | — | — |
| Modified Carbon 2 | — | — | — | 80.00 | — | — | — |
| Modified Carbon 3 | — | — | — | — | 80.00 | — | — |
| Modified Carbon 4 | — | — | — | — | — | 80.00 | — |
| Modified Carbon 5 | — | — | — | — | — | — | 80.00 |
| Silane Coupling Agent[*3] | — | 2.00 | 2.00 | 2.00 | 2.00 | 2.00 | 2.00 |
| Zinc Oxide | 3.00 | 3.00 | 3.00 | 3.00 | 3.00 | 3.00 | 3.00 |
| Stearic Acid | 2.00 | 2.00 | 2.00 | 2.00 | 2.00 | 2.00 | 2.00 |
| Antioxidant 6C | 3.00 | 3.00 | 3.00 | 3.00 | 3.00 | 3.00 | 3.00 |
| Antioxidant RD | 2.00 | 2.00 | 2.00 | 2.00 | 2.00 | 2.00 | 2.00 |
| Wax | 1.00 | 1.00 | 1.00 | 1.00 | 1.00 | 1.00 | 1.00 |
| Aromatic Oil | 14.00 | 14.00 | 14.00 | 14.00 | 14.00 | 14.00 | 14.00 |
| Powdered Sulfur | 1.50 | 1.50 | 1.50 | 1.50 | 1.50 | 1.50 | 1.50 |

TABLE I-continued

|  | Comp. Ex. 1 | Comp. Ex. 2 | Ref. Ex. 1 | Ex. 1 | Ex. 2 | Ex. 3 | Ex.4 |
|---|---|---|---|---|---|---|---|
| Vulcanization Accelerator CZ | 2.00 | 2.00 | 2.00 | 2.00 | 2.00 | 2.00 | 2.00 |
| Evaluation of Physical Property | | | | | | | |
| Tensile Test 300% Modulus | 10.3 | 11.2 | 11.9 | 11.0 | 11.0 | 9.4 | 12.1 |
| $T_B$ | 21.5 | 22.1 | 18.9 | 21.6 | 21.6 | 20.1 | 21.3 |
| $E_B$ | 566 | 537 | 450 | 515 | 530 | 534 | 503 |
| JIS Hardness | 61 | 62 | 61 | 61 | 61 | 61 | 61 |
| tan δ (0° C.) | 0.650 | 0.631 | 0.637 | 0.624 | 0.630 | 0.633 | 0.630 |
| tan δ (60° C.) | 0.263 | 0.260 | 0.255 | 0.227 | 0.226 | 0.222 | 0.238 |
| Abrasion Resistance (Index) | 100 | 96 | 99 | 100 | 104 | 103 | 108 |

*[1]Emulsion Polymerized SBR (Styrene content 35 wt %, 37.5 phr oil extended)
*[2]Solution Polymerized SBR (Styrene content 18 wt %, Vinyl content 13 mol % (per amount of butadiene), 20 phr oil extended)
*[3]Si69 (made by Degussa)

The physical properties were determined as follows. The results of evaluation of the rubber compositions obtained are shown in Table I.

1) Tensile Strength

This was measured according to a method of JIS K6251.

2) JIS Hardness

This was measured according to a method of JIS K6253.

3) tan δ

This was measured using a viscoelasticity spectrometer made by Toyo Seiki Seisakusho under an amplitude of ±2%, a frequency of 20 Hz, and a static stress of 10%.

4) Abrasion Resistance Index

A Lambourn abrasion tester was used for measurement under conditions of a load of 5 kg, a slip rate of 25%, a time of 4 minutes, and room temperature and the loss due to abrasion was indicated as an index. Note that the larger the figure, the better the abrasion resistance.

As is clear from the results shown in Table I, in the Examples using the modified carbon black for rubber reinforcement produced by the process according to the present invention, a rubber composition is obtained with an excellent abrasion resistance, while being provided with the property of silica a low tan δ at a high temperature (60° C.) and a high tan δ at a low temperature (0° C.) compared with the prior art Examples, that is, Comparative Examples 1 and 2. That is, according to the present invention, it is possible to produce a rubber composition containing modified carbon black for rubber reinforcement which, when used as a tread rubber for a tire, for example, has a high grip, is superior in fuel economy, is excellent in abrasion resistance, and is free from the radio noise and adverse influence on electronic equipment due to a high electric resistance by a simple process and a lower cost compared with the prior art processes.

What is claimed is:

1. A process for producing a modified carbon black for rubber reinforcement, said process consisting essentially of:

initially adding, to carbon black, water-dispersed silica and an organosilane compound having the formula (I):

$$R^1{}_n\text{—Si—}(OR^2)_{4-n} \qquad (I)$$

wherein $R^1$ represents a hydrocarbon group having 1 to 10 carbon atoms, $R^2$ represents a hydrogen atom or a hydrocarbon group having 1 to 10 carbon atoms, n is 1 or 2, and $R^1$ and $R^2$ may be the same or different, and then mixing and dispersing the mixture of carbon black, water-dispersed silica and organosilane compound.

2. A process for producing a modified carbon black for rubber reinforcement as claimed in claim 1, wherein the total amount of the water-dispersed silica and the organosilane compound is 0.1% to 50% by weight, in terms of $SiO_2$, based upon the total weight of the modified carbon black.

3. A process for producing a modified carbon black for rubber reinforcement as claimed in claim 1, wherein the amount of the organosilane compound is 80% by weight or less, in terms of $SiO_2$, based upon the total amount of the water-dispersed silica and the organosilane compound.

4. A rubber composition comprising a crosslinkable rubber and the modified carbon black, compounded therein, produced by the process according to claim 1.

5. A rubber composition as claimed in claim 4, wherein the amount of the modified carbon black is 10 to 200 parts by weight, based upon 100 parts by weight of the crosslinkable rubber.

6. A process for producing a modified carbon black for rubber reinforcement as claimed in claim 1, wherein $R^1$ in the formula (I) represents a saturated aliphatic hydrocarbon group having 1 to 10 carbon atoms, an alicyclic hydrocarbon group having 3 to 10 carbon atoms or an aromatic hydrocarbon group having 6 to 10 carbon atoms.

7. A rubber composition comprising a crosslinkable rubber and a modified carbon black, compounded therein, said carbon black modified with a water-dispersed silica and an organosilane compound having the formula (I):

$$R^1{}_n\text{—Si—}(OR^2)_{4-n} \qquad (I)$$

wherein $R^1$ in the formula (I) represents a saturated aliphatic hydrocarbon group having 1 to 10 carbon atoms, an alicyclic hydrocarbon group having 3 to 10 carbon atoms or an aromatic hydrocarbon group having 6 to 10 carbon atoms, $R^2$ represents a hydrogen atom or a hydrocarbon group having 1 to 10 carbon atoms, n is 1 or 2, and $R^1$ and $R^2$ may be the same or different.

* * * * *